(12) United States Patent
Chen et al.

(10) Patent No.: US 12,224,662 B2
(45) Date of Patent: Feb. 11, 2025

(54) LLC RESONANT CONVERTER WITH VARIABLE TURNS RATIO

(71) Applicant: PHIHONG TECHNOLOGY CO., LTD., Taoyuan (TW)

(72) Inventors: Chun-Chen Chen, Taoyuan (TW); Jian-Hsieng Lee, Taoyuan (TW); Yao-Chun Tung, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 242 days.

(21) Appl. No.: 17/966,833

(22) Filed: Oct. 15, 2022

(65) Prior Publication Data
US 2024/0079952 A1 Mar. 7, 2024

(30) Foreign Application Priority Data
Sep. 5, 2022 (TW) .................. 111133618

(51) Int. Cl.
*H02M 3/335* (2006.01)
*H02M 1/12* (2006.01)
*H02M 3/00* (2006.01)

(52) U.S. Cl.
CPC ............. *H02M 3/015* (2021.05); *H02M 1/12* (2013.01)

(58) Field of Classification Search
CPC .......... H02M 1/12; H02M 3/01; H02M 3/015; H02M 3/335; H02M 3/33507; H02M 3/33538; H02M 3/33546; H02M 3/33569; H02M 3/33573
See application file for complete search history.

(56) References Cited

U.S. PATENT DOCUMENTS

| | | | |
|---|---|---|---|
| 2020/0083818 A1* | 3/2020 | Lin ...................... | H02M 3/285 |
| 2020/0204079 A1* | 6/2020 | Guo ..................... | H02M 3/285 |
| 2021/0408927 A1* | 12/2021 | Zhang ................... | H02M 3/01 |
| 2024/0072673 A1* | 2/2024 | Sigamani .......... | H02M 3/33571 |

* cited by examiner

*Primary Examiner* — Gary L Laxton
(74) *Attorney, Agent, or Firm* — Chih Feng Yeh; Yongjean Consulting Inc.

(57) ABSTRACT

An LLC resonant converter with variable turns ratio includes a switching circuit coupled to a DC input voltage for converting the DC voltage into switching signal, a resonant tank coupled to the switching circuit and configured to receive the switching signal to provide a primary current, a transformer circuit coupled to the resonant tank. The transformer circuit includes a plurality of separated transformers, each has a primary side winding and a side secondary side winding, where individual transformer has different turns of primary side winding, which can be dynamically selected to couple with the primary side winding of other transformers in series or in parallel to form a dynamically changing equivalent primary side winding, so that the turns ratio in the transformer circuit can be dynamically changed accordingly.

20 Claims, 8 Drawing Sheets

LLC RESONANT CONVERTER WITH VARIABLE TURNS RATIO

CROSS-REFERENCE STATEMENT

The present application is based on, and claims priority from, Taiwan Patent Application Number 111133618, filed Sep. 5, 2022, the disclosure of which is hereby incorporated by reference herein in its entirety.

BACKGROUND

Technical Field

The present invention relates to an LLC resonant converter, and more particularly, an LLC resonant converter with variable turns ratio.

Related Art

In conventional switching power supplies, their magnetic components are usually employed for filtering, energy storage and transmission purposes. During the operation of the switching power supply, the higher switching frequency of the switching device, the smaller size of the magnetic element can be realized, and it is easier to achieve miniaturization, weight reduction and cost reduction of the power supply device. Increasing the switching frequency of the switching power supply will also correspondingly increase the switching loss of the switching device, so the soft-switching technology emerges as the time being evolved. To achieve ideal soft switching, the best scenario is to have the switching device turn off and on when both the voltage and current are zero (zero-voltage switching, ZVS; zero-current switching, ZCS), so that the loss occurred is really zero. For achieving this purpose, a resonance technology must be utilized.

Based on the principle of the circuitry operation, an inductor and a capacitor can be connected in series or in parallel to form a resonant circuit, when the power supply is a DC power supply, the current in the resonant circuit changes according to a sinusoidal law. Since the current or voltage varies based on the sinusoidal law, there is a zero-crossing point, and if the switching device is turned on or off at this moment, the resulting loss is zero.

The LLC resonant converter is a resonant inverter with three reactive elements where the DC input voltage is turned into a square wave by a switch network arranged as either a half- or full-bridge to feed the resonant LLC tank that effectively filters out harmonics providing a sinusoidal like voltage and current waveform. This in turn feeds a transformer that provides voltage scaling and primary-secondary isolation. The converter power flow is controlled by modulating the square wave frequency with respect to the tank circuit's resonance. In an LLC resonant converter, all semiconductor switches are soft-switching, or zero-voltage switching (ZVS), at turn-on for the primary MOSFETs and zero-current switching (ZCS) at both turn-on and turn-off for the rectifiers in the secondary; resulting in low electromagnetic emissions levels (EMI). In addition, it can enable a high degree of integration in the magnetic parts, enabling the design of converters with higher efficiency and power density.

An LLC resonant converter is a topology of a series resonant converter that provides an output voltage signal that is isolated from the input signal. The LLC resonant converter includes a series resonant circuit connected in series with the primary winding of the transformer. A switching circuit alternately couples the switching node of the resonant circuit to the positive supply node and the ground node to provide an AC resonant current flowing through the primary winding of the transformer. A secondary circuit, such as a rectifier, provides the output voltage to drive a load. Where the secondary circuit may comprise a synchronous rectifier switch or a diode rectifier. The primary side switching circuit can be adjusted to regulate the output voltage. The LLC resonant converter has high efficiency and high power density, and can provide zero-voltage switching and low turn-off current for primary side switches over a fairly wide load range. These advantages make the LLC resonant converter suitable for a variety of applications, such as high-performance servers and telecom applications.

As mentioned earlier, when the primary side switching frequency is lower than the resonant frequency, the primary side switches can be turned off with zero current switching. This helps increasing the capability of voltage gain without reducing the efficiency of applications with hold-up time requirements. The size of the magnetic elements and capacitors of the LLC resonant converter can be reduced while operating the LLC resonant converter at high switching frequencies. However, this these increases switching-related losses and magnetic-component losses, resulting in inefficiencies. Magnetic components used in the LLC resonant converter remain as a limitation in improving converter efficiency due to core and winding losses, especially at high switching frequencies. Further improvements are required to support higher efficiency and power density of the LLC resonant converter.

Magnetic components of the LLC resonant converter can change the parameters of the resonant tank by changing the series/parallel connection of the windings on the printed circuit board, but the range of fine-tuning is limited. In the case that the external inductance or capacitance components coupled with resonant tank of the LLC resonant converter, the parameters of the resonant tank can be greatly changed. How to increase the adjustment range of the resonant tank parameters to meet the wider requirements of output voltage and current is the current development trend of the LLC resonant converter.

Therefore, to increase power density and to widen the range of output voltage and current of the LLC resonant converter by introducing variable turns ratio of transformer windings and by changing resonant tank parameters have became become an urgent need to improve the deficiencies of the existing LLC resonant converters.

SUMMARY

According to the design concept mentioned above, an LLC resonant converter with turns ratio is proposed, which includes a switching circuit coupled to an input DC voltage for converting the input DC voltage into a switching signal; a resonant tank electrically coupled to the switching circuit, the resonant tank including a resonant inductor, a magnetizing inductor and a resonant capacitor connected in series to receive the switching signal for providing a primary current; a transformer circuit electrically coupled to the resonant tank, the transformer circuit having a plurality of discrete transformers, each of the discrete transformers containing a primary winding and a secondary winding, wherein the primary winding of each of the discrete transformers have different turns and are dynamically selected to be electrically coupled or isolated from the resonant tank, and are dynamically selected to be connected in series or in parallel with the primary side windings of other transformers to form a dynamically changed equivalent primary winding of the transformer circuit; wherein the turns of the secondary winding of each of the discrete transformers are fixed and the same, so that turns ratio of the transformer circuit can be dynamically changed accordingly; and a rectifying and filtering circuit electrically coupled to the transformer circuit to rectify and filter a secondary current outputted by the secondary winding for providing an output voltage; wherein one end of the resonant inductor is electrically coupled to the switching circuit and another end of the resonant inductor is connected in series to the equivalent primary winding; wherein the magnetizing inductor is connected in series to the resonant inductor, the resonant capacitor with one end is connected in series to the magnetizing inductor and the equivalent primary winding, and with another end is coupled to the switching circuit; wherein the magnetizing inductor is connected in parallel to the equivalent primary winding.

In one preferred embodiment, the equivalent primary winding is formed by arranging a plurality of switches to dynamically adjust coupling between the primary windings.

In one preferred embodiment, the plurality of switches are transistor switching devices, relays or the like.

In one preferred embodiment, inductance of the resonant inductor, inductance of the magnetizing inductor and the turns ratio are dynamically adjusted by the plurality of switches.

In one preferred embodiment, the primary windings and the secondary windings are fabricated on a multi-layered printed circuit board (PCB) to reduce stray characteristics caused by wiring.

In one preferred embodiment, the LLC resonant converter with turns ratio further includes an adjustable capacitor been disposed in the multi-layered PCB and been integrated into the primary windings and the secondary windings of the transformer circuit to form an additional resonant capacitor.

In one preferred embodiment, the adjustable capacitor is formed by fabricating a plurality of metal plates with fixed area and size at same location on each layer of the multi-layered PCB, and the plurality of metal plates together with a plurality of dielectric layers therein between are combined to form the adjustable capacitor.

In one preferred embodiment, the adjustable capacitor changes resonant capacitance of the resonant tank by adjusting distance between the metal plates and by changing configuration of positive and negative terminals of the metal plates.

In one preferred embodiment, capacitance of the additional resonant capacitor is configured to couple to the resonant capacitor in parallel, in series or completely isolated by arranging a plurality of switches between the additional resonant capacitor and the windings of the transformer circuit.

In one preferred embodiment, the plurality of switches are configured to dynamically adjust turns ratio of the transformer circuit by sending turns ratio adjustment signals to the transformer circuit through an external controller coupled to the LLC resonant converter, according to received feedback of output voltage and feedback of output current respectively to achieve increasing of range of output voltage and current of the LLC resonant converter.

In one preferred embodiment, the plurality of switches are configured to dynamically adjust capacitance of the resonant capacitor by sending resonant capacitor adjustment signals to the resonant tank through an external controller coupled to the LLC resonant converter, according to received feedback of output voltage and feedback of output current respectively to achieve increasing of range of output voltage and current of the LLC resonant converter.

In one preferred embodiment, the external controller is a microprocessor, microcontroller, a digital processor or the like.

In one preferred embodiment, the plurality of discrete transformers form an array-typed transformer.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As mentioned in the background section, magnetic components of the LLC resonant converter can change the parameters of the resonant tank by changing the series/parallel connection of the windings on the printed circuit board, but the range of fine-tuning is limited. In the case that the external inductance or capacitance components coupled with resonant tank of the LLC resonant converter, the parameters of the resonant tank can be greatly changed. How to increase the adjustment range of the resonant tank parameters to meet the wider requirements of output voltage and current is the current development trend of the LLC resonant converter.

Figure 1:
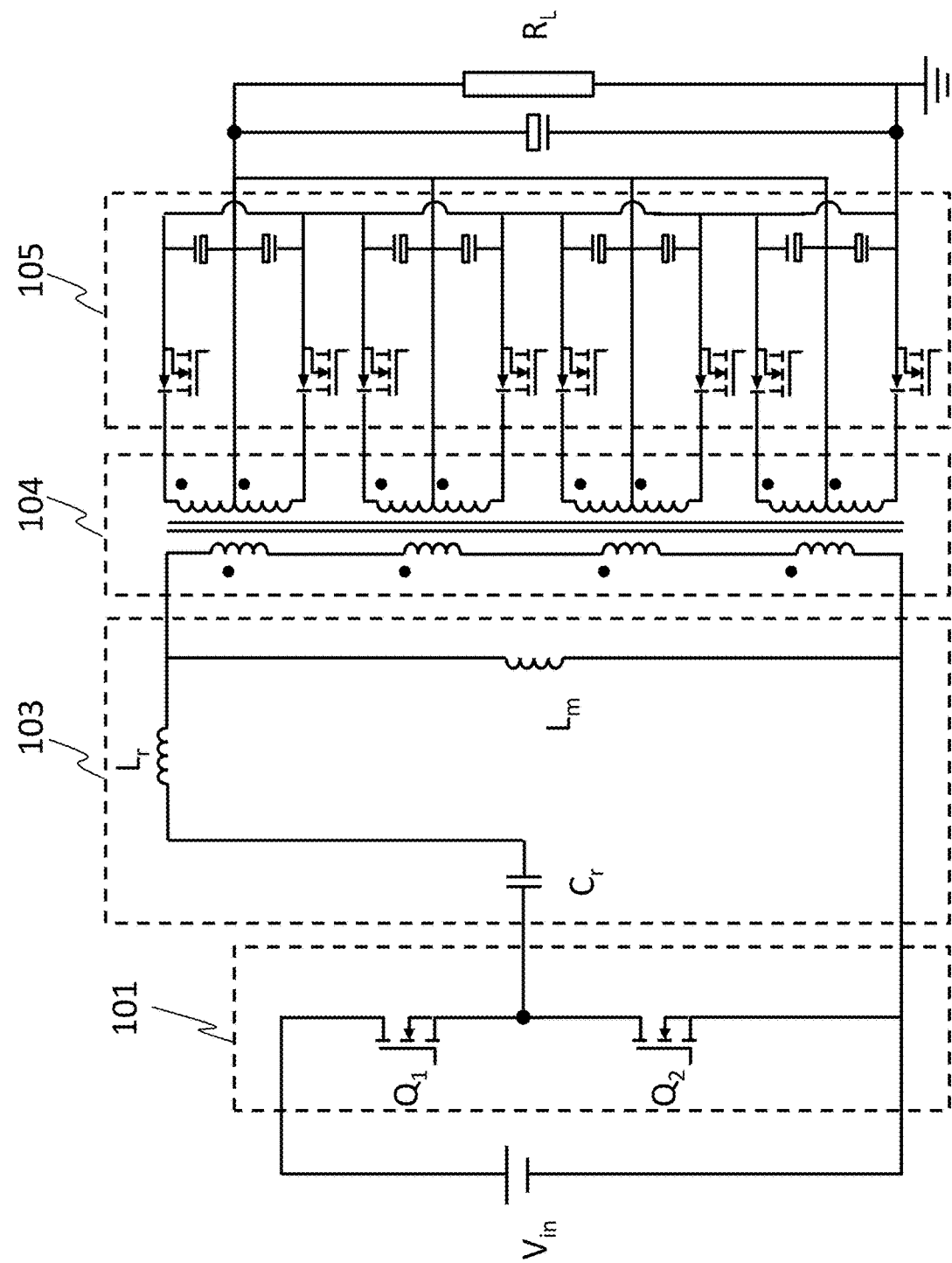
FIG. 1 illustrates a schematic circuit diagram of a conventional LLC resonant converter according to the prior art.

FIG. 1 shows a schematic circuit diagram of a conventional LLC resonant converter, which adopts a full-bridge LLC power resonant converter with an array transformer core integrated with synchronous rectification functionality. The LLC resonant converter is used to convert the DC input voltage $V_{in}$ into the DC output voltage $V_o$ for supplying to the load $R_L$, which includes a half-bridge switching circuit 101, a resonant tank 103, a transformer circuit 104 and a rectifying and filtering circuit 105. The half-bridge switching circuit 101 is used to control the input of the DC voltage $V_{in}$. The resonant tank 103 is electrically coupled to the switching circuit 101 and includes a resonant inductor $L_r$, a magnetizing inductor $L_m$ and a resonant capacitor $C_r$ connected in series. The transformer circuit 104 is electrically coupled to the resonant tank 103 and includes magnetic cores, primary side windings, and secondary side windings. The rectification form of the secondary side windings is center-tapped type rectifying circuit, which is rectified through the rectification switches.

During the operation of the LLC resonant converter 100, the output/input nodes of the half-bridge switching circuit 101 are turned ON or OFF repeatedly due to the periodic switching of the switches to generate a periodically changing switching signal. When the signal is fed to the resonant tank 103, the magnetizing inductor $L_m$ is excited to repeatedly generate voltage and induction electromotive force. Since the primary winding of the transformer circuit 104 is connected in series with the resonant inductor $L_r$ and the resonant capacitor $C_r$ of the resonant tank 103, and is connected in parallel with the magnetizing inductor $L_m$, enabling the formation of the primary side current in the circuit that changes according to the sinusoidal law, and the secondary side windings of the transformer circuit 104 continue to generate periodically varying current, which are rectified and filtered by the rectifying and filtering circuit 105 to convert the periodically varying current into output DC current for providing DC output voltage $V_o$ to the load $R_L$. Basically, once the circuit topology of the LLC resonant converter 100 is finalized, its resonant tank parameters are then determined and cannot be adjusted for different operating scenarios. That is, output voltage or output current range of the LLC resonant converter 100 cannot be adjusted according to its operational needs.

In order to improve the power density of LLC resonant converter and to increase its range of output voltage or current. The present invention proposes to improve the power density of power converter by introducing variable turns ratio of winding of the transformer and by varying parameters of the resonant tank of the LLC resonant converter.

The technical means proposed by the present invention are to introduce the windings with variable turns ratio on the PCB for reducing the influence of stray characteristics caused by the windings and to adjust parameters of the resonant tank for improving range of output voltage or current and power density of the LLC resonant converter, enabling that the LLC resonant converter can be effectively operated at operating frequencies beyond Mega Hz.

Generally, in order to reduce the size of the magnetic components, the magnetic components and windings are usually configured by using the magnetic flux cancellation technology. Designing the windings on the printed circuit board (PCB) can effectively reduce the stray characteristics caused by the windings. Since the windings are designed and fabricated on the PCB, the windings with characteristic of 0.5 turn can be designed based on the routing design of the wirings on the PCB. Therefore, the variable turns ratio N with finely tunable capability can be achieved through configuring series and or/parallel connection between the windings. At the same time, the parameters of the resonant tank, such as the magnetizing inductance of $L_m$ and the resonant inductance (leakage inductance) of $L_r$ of the transformer will also be changed.

In order to realize the planarization and integration of LLC resonant power converters, the array-typed transformer (a collection of multiple discrete transformers) can be designed to flexibly change the series-parallel relationship between the primary side windings as well as between the secondary side windings in practical applications, and to adjust all the required turns ratio of the array-typed transformer, enabling that the LLC resonant power converters to meet wider requirements of output voltage and current.

Figure 2:
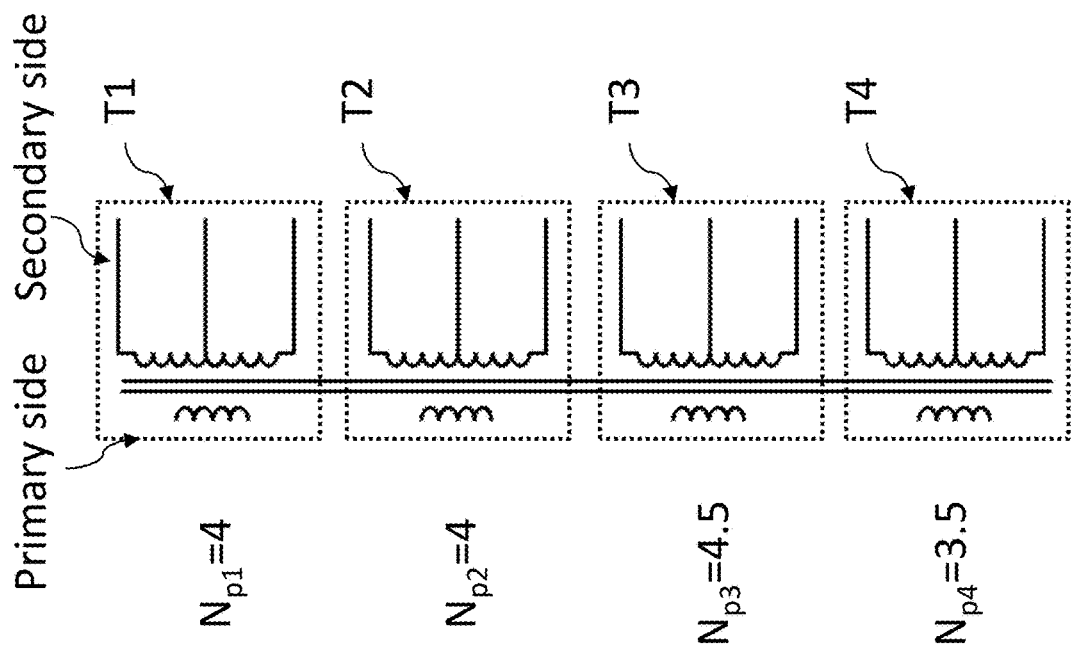
FIG. 2 illustrates schematic circuit diagram of a transformer winding with a variable turns ratio in the LLC resonant power converter according to one embodiment of the present invention.

FIG. 2 illustrates a schematic circuit diagram of windings of an array-typed transformer with a variable turns ratio in the LLC resonant power converter, where the windings (including primary/secondary windings) are fabricated on PCBs. In the embodiment shown in the FIG. 2, the transformers (T1, T2, T3, T4) are four discrete transformers, which can be configured into an array. Since the windings are designed and fabricated on the PCB, the windings with characteristic of 0.5 turn can be designed based on the routing design of the wirings on the PCB, each of the secondary windings shown in FIG. 2 is set to one turn, and each of the primary windings of the discrete transformers T1-T4 is designed individually with different turns. In an embodiment, primary winding of the discrete transformer T1 is designed to be 4 turns, primary winding of the discrete transformer T2 is designed to be 4 turns, primary winding of the discrete transformer T3 is designed to be 4.5 turns, primary winding of the discrete transformer T4 is designed to be 3.5 turns. According to the design described above, parameters of the resonant tank, for example, the resonant inductance of $L_r$, the magnetizing inductance of $L_m$ and the turns ratio N of the windings of the array-type transformer can be dynamically adjusted by configuring the coupling between windings in series and or/parallel through arrangement of switches, such as transistor switching devices, relays, between these components.

In an embodiment, the coupling between windings in series and or/parallel can be realized by arranging a plurality of switches between these windings.

In an embodiment, the primary windings of the transformers T1 and T2 are configured to be connected in series while the rest of discrete transformers T3 and T4 are isolated by arranging a plurality of switches between the windings, the turns of the individual primary windings of T1 and T2 are $N_{p1}=4$ and $N_{p2}=4$, respectively. The resulting combined turns of the primary winding is 8 turns, and the turns ratio of the transformer is 8:1.

In an embodiment, the primary windings of the transformers T1 and T3 are configured to be connected in series while the rest of discrete transformers T2 and T4 are isolated by arranging a plurality of switches between the windings, the turns of the individual primary windings of T1 and T3 are $N_{p1}=4$ and $N_{p3}=4.5$, respectively. The resulting combined turns of the primary winding is 8 turns, and the turns ratio of the transformer is 8.5:1.

Similarly, the primary windings of the transformers T1 and T4 are configured to be connected in series while the rest of discrete transformers T2 and T3 are isolated by arranging a plurality of switches between the windings, the turns of the individual primary windings of T1 and T3 are $N_{p1}=4$ and $N_{p4}=3.5$, respectively. The resulting combined turns of the primary winding is 8 turns, and the turns ratio of the transformer is 7.5:1.

In the above examples, only two of the four discrete transformers are selected for various combinations of series coupling between windings to obtain different turns ratios accordingly. The number of discrete transformers can be increased or decreased according to actual application needs. In a similar situation, according to different applications, three out of the four discrete transformers can be selected as different combination of series between coupling windings. Or, alternatively, two of the four discrete transformers are selected as different combinations of parallel coupling or combined series-parallel coupling between coupling windings. Various combinations are not listed here one by one, and the above examples are only for illustrative purposes, not for limiting the scope of the claims of the present invention.

With the design concept of the present invention, in order to achieve the purpose of increasing the range of output voltage and output current of the LLC resonant converter, in addition to dynamically changing parameters of the resonant tank, such as the resonant inductance of $L_r$, the magnetizing inductance of $L_m$ and the turns ratio N of the transformer through the aforementioned methods, one of the parameters of the resonant tank, i.e. capacitance of the resonant capacitor $C_r$ can also be varied by integrating the capacitance of the PCB based on the fact that windings of the transformer (including primary/secondary windings) are fabricated on the PCB. For seeing the detailed implementation, please refer to FIG. 3.

Typically, the array-typed transformer is utilized a four-layered PCB board to make the wiring of its windings, including primary windings and secondary windings, where the wiring of the primary windings will be made on the second layer (Layer 2) and the third layer (Layer 3), and the wiring of the secondary windings will be made on the first layer (Layer 1) and the fourth layer (Layer 4).

Figure 3:
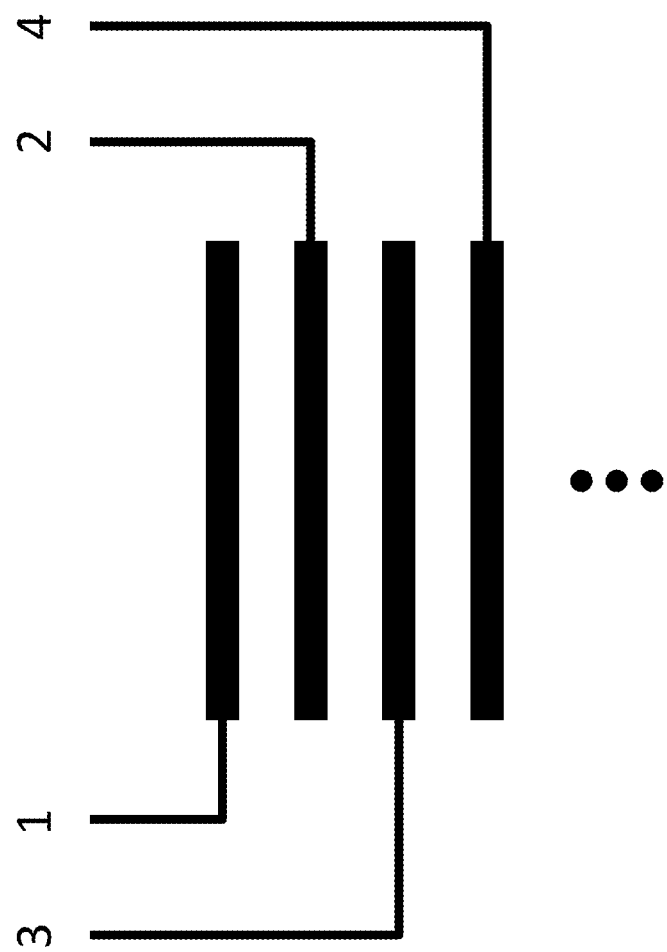
FIG. 3 illustrates a schematic diagram showing how to use a multilayer printed circuit board (PCB) to fabricate an adjustable capacitor in the LLC resonant power converter according to one embodiment of the present invention.

FIG. 3 illustrates a schematic diagram showing how to use a multi-layered PCB to fabricate an adjustable capacitor in the LLC resonant power converter. As shown in FIG. 3, a four-layered PCB board is used as an example, in a selected area of the PCB board, a metal plate with a fixed area and size is fabricated at the same position on each layer. The drawing shown in the figure is a cross-sectional view of the adjustable capacitor. For simplicity, only the metal plates (to act as capacitor plates) are shown in the drawings, and the dielectric layers (such as fiber glass plates) between the metal plates are not shown. The aforementioned plural metal plates and plural dielectric layers therein between can be combined and form an additional resonant capacitor $C_r'$ to be integrated with the windings of the transformer fabricated on the PCB.

In one embodiment, referring to FIG. 3, when the metal plate electrodes 1 and 2 are respectively selected as the positive and negative ends of the capacitor, the capacitance value is equivalent to two capacitance units; in a case that the metal plate electrodes 1 and 3 are respectively selected as the positive and negative ends of the capacitor, the capacitance value is equivalent to one capacitance unit; in a case that both the metal plate electrodes 1 and 3 are selected as the positive ends of the capacitor, and both the metal plate electrodes 2 and 4 are selected as the negative ends of the capacitor, the capacitance value is equivalent to four capacitance units. The resonant capacitance of the resonant tank of the LLC resonant power converter can be varied by changing the distance between the capacitor plates and changing the configuration of the positive and negative terminals of the capacitor plates.

The examples mentioned above are only selected to take a four-layered PCB board as an example. The additional capacitance formed in between layers of the PCB integrated with the windings of the transformers fabricated on the PCB, which can easily be extended to PCB board with different layers, The additional capacitance formed in between layers of the PCB to act as an additional resonant capacitor $C_r'$, which can be configured to be connected in parallel, in series or completely isolated from the original resonant capacitor $C_r$ of the original LLC resonant converter by arranging a plurality of switches between the windings.

Figure 4A:
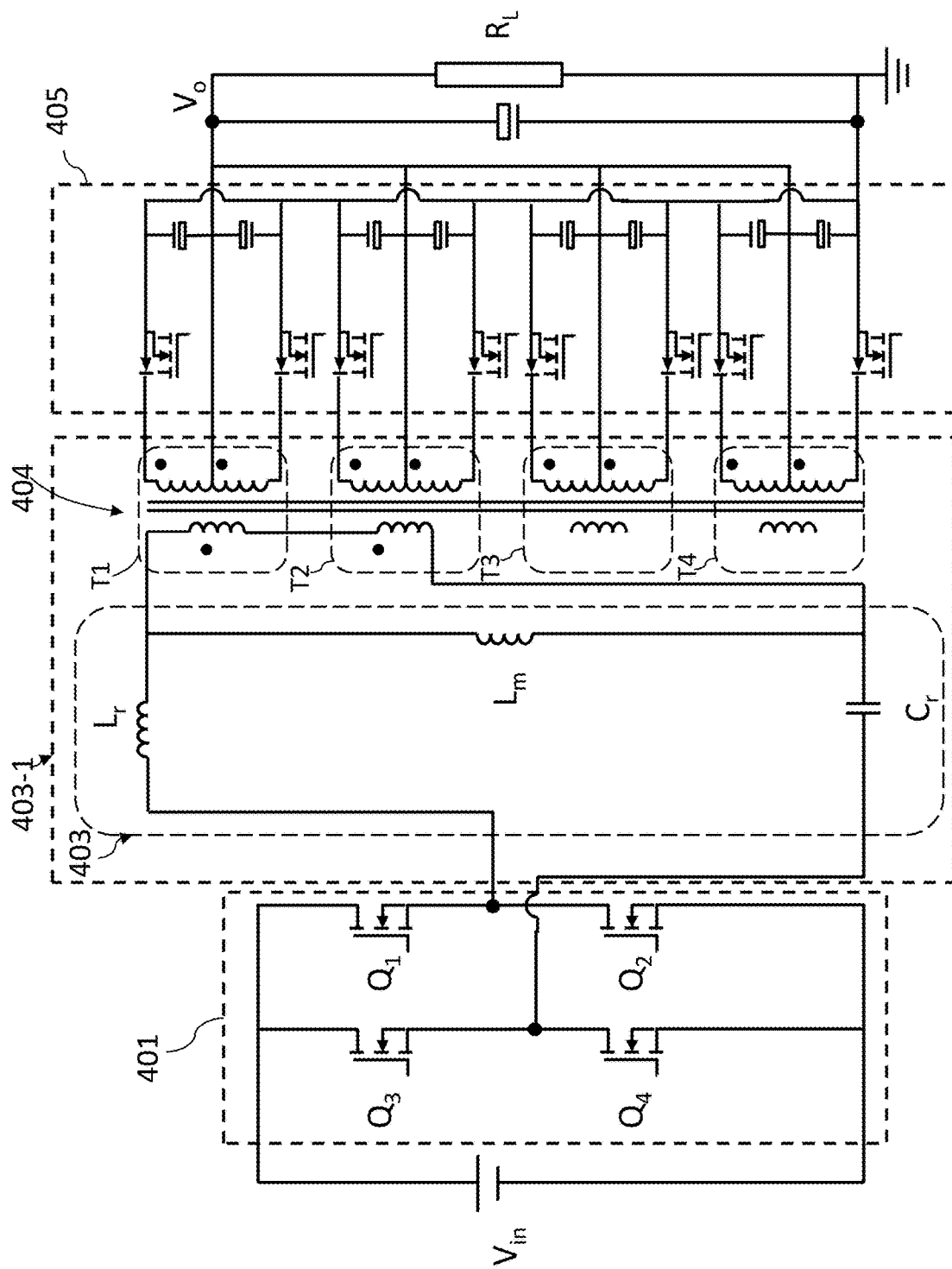
FIG. 4(A) illustrates a schematic circuit diagram of an LLC resonant converter according to one embodiment of the present invention.

FIG. 4(A) shows a schematic circuit diagram of an LLC resonant converter, as depict in FIG. 4(A), the LLC resonant converter is used to convert a DC input voltage $V_{in}$ into a DC output voltage $V_o$ for supplying to the load $R_L$, which includes a full-bridge switching circuit 401, a resonant tank 403, transformer circuit 404 including individual transformers (T1, T2, T3 and T4), a rectifying and filtering circuit 405 and an external control circuit (not shown). In FIG. 4(A), the switching circuit 401 is taking a full-bridge switching circuit as an example but not limited to it, which can also be a half-bridge switching circuit. The rectifying and filtering circuit 405 is electrically coupled to the transformer circuit including a plurality of secondary windings with center-tapped form, each center-tapped secondary winding includes positive half-cycle and negative half-cycle winding, and the positive and negative half-cycle windings are connected in series with a rectifier switch and a capacitor, which are respectively used as positive and negative half-cycle rectification and filtering. The full-bridge switching circuit 401 contains switches Q1, Q2, Q3 and Q4, during the positive half-cycle operation mode, the primary side upper bridge switch Q1 and the primary side lower bridge switch Q4 are turned on while the primary side upper bridge switch Q3 and the primary side lower bridge switch Q2 are turned off, and the current flows through $L_r$, primary windings of transformers T1 and T2, $L_m$ connected in parallel with the primary windings of the transformers T1 and T2, and $C_r$, and then are rectified and filtered by the upper half-cycle windings of the respectively coupled secondary windings to generate the output voltage $V_o$, which is provided to the load Rl, for use; during the negative half-cycle operation mode, the primary side upper bridge switch Q3 and the primary side lower bridge switch Q2 are turned on while the primary side upper bridge switch Q1 and the primary side lower bridge switch Q4 are turned off, and the current flows through $L_r$, primary windings of transformers T1 and T2, $L_m$ connected in parallel with the primary windings of the transformers T1 and T2, and $C_r$, and then are rectified and filtered by the lower half-cycle windings of the respectively coupled secondary windings to generate the output voltage $V_o$, which is provided to the load $R_L$ for use.

In accordance with the concepts of the present invention and the illustrations of FIGS. 2-3 described in previous paragraphs showing as examples, circuit block 403-1 shown in FIG. 4(A), which represents the resonant tank 403 coupled to the transformer circuit 404 of the LLC resonant power converter. Designs of the circuit block 403-1 with different variations are possible, taking FIG. 4(A) as an example, which shows that the primary windings of transformers T1 and T2 are connected in series, and transformers T3 and T4 are disconnected and isolated from the rest the transformer circuit.

Figure 4C:
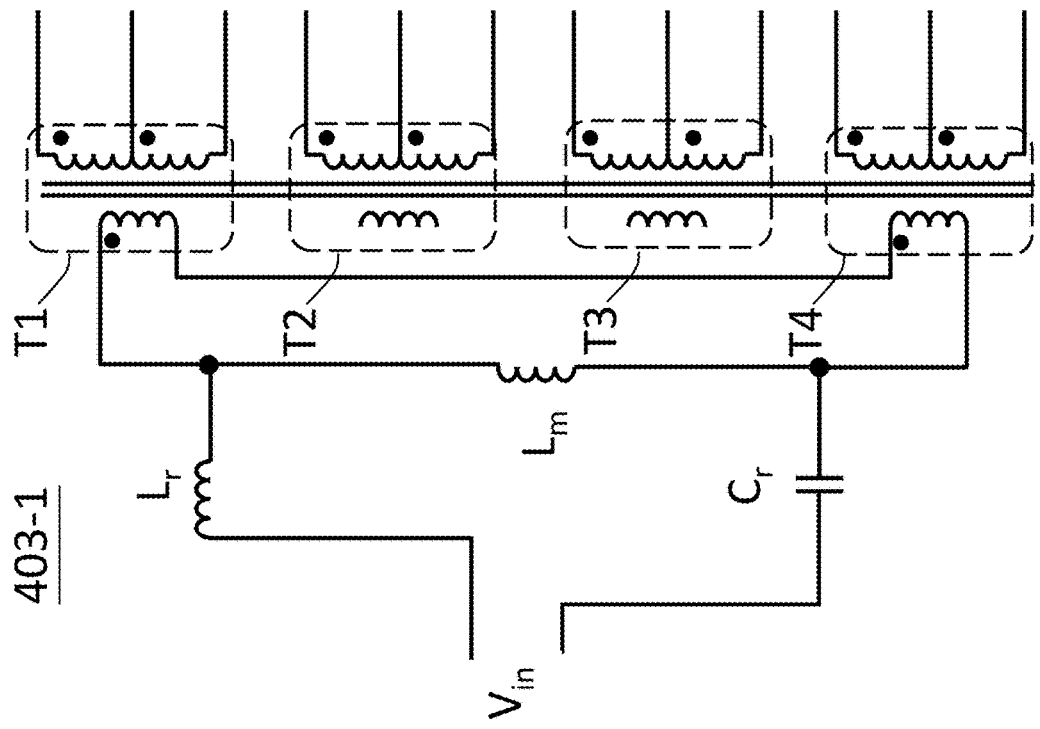
FIG. 4(B)-4(E) respectively illustrate schematic diagrams of various implementation examples of the resonant tank and transformer circuit block according to the present invention.
Figure 4B:
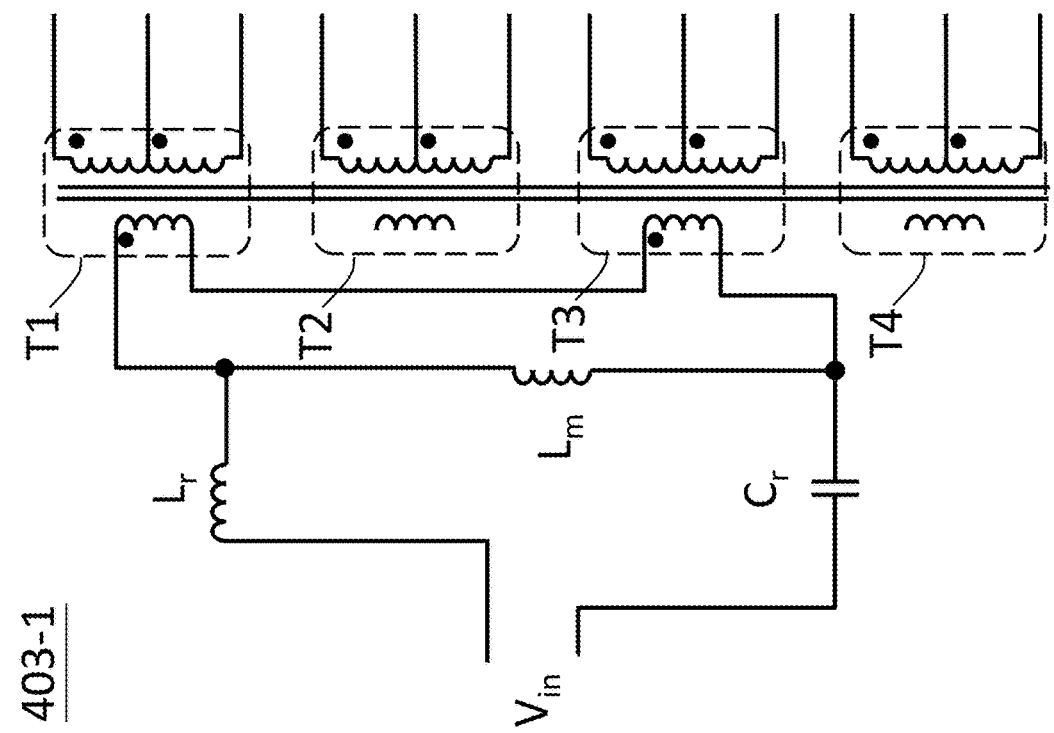

FIG. 4(B) shows other example of the circuit block 403-1, where the primary windings of the transformers T1 and T3 are connected in series, and the transformers T2 and T4 are disconnected and isolated from the rest of the transformer circuit.

FIG. 4(C) shows yet other example of the circuit block 403-1, where the primary windings of the transformers T1 and T4 are connected in series, and the transformers T2 and T3 are disconnected and isolated from the rest of the transformer circuit.

Figure 4E:
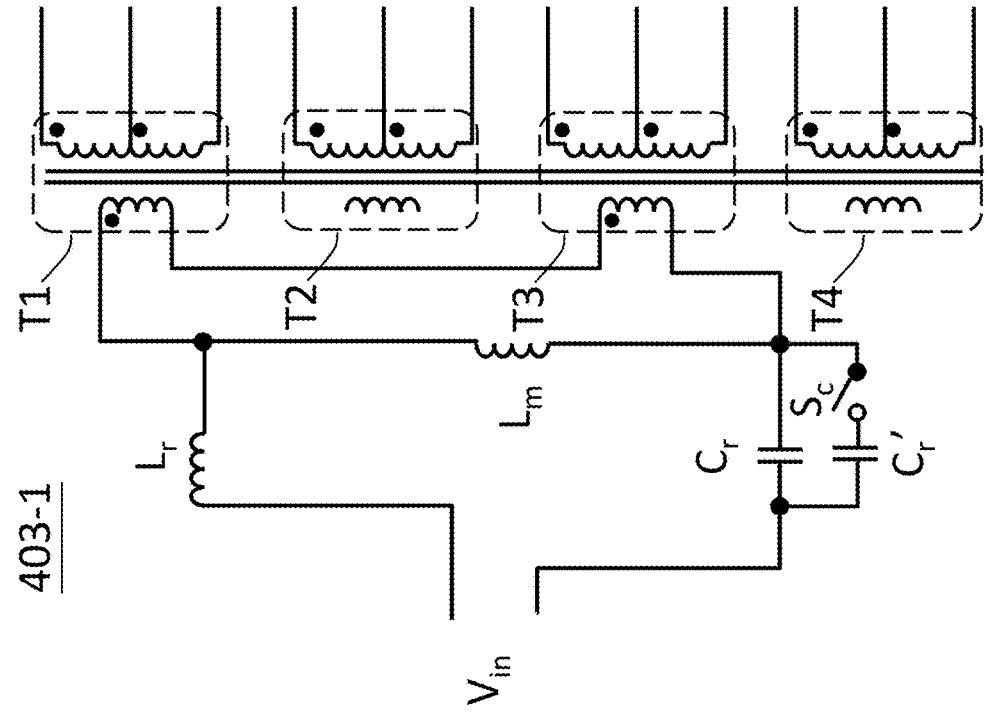
Figure 4D:
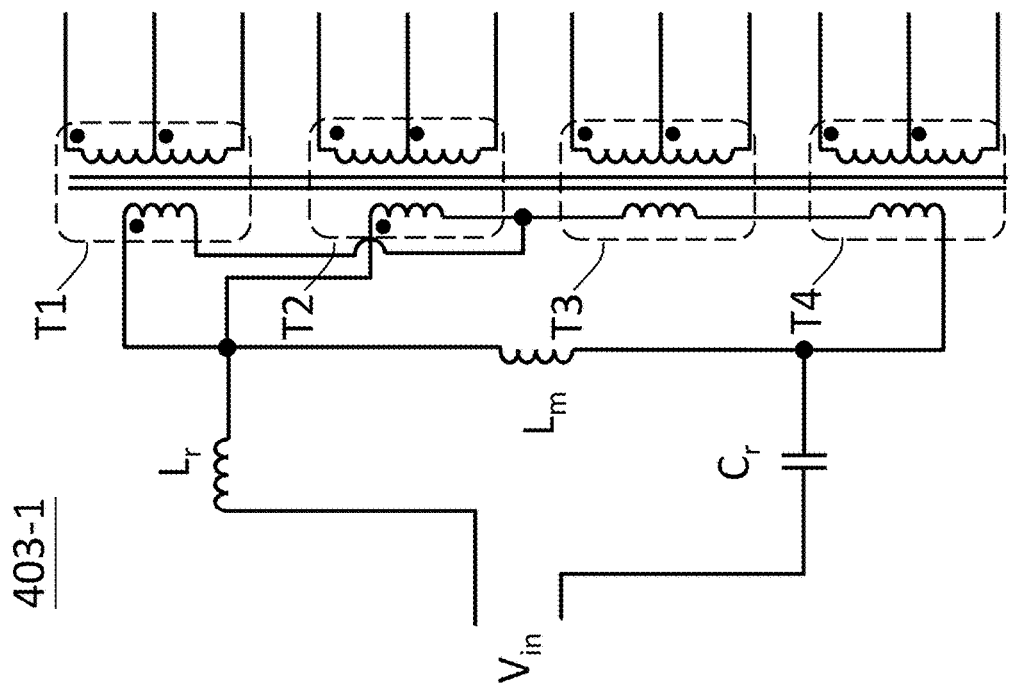

FIG. 4(D) shows yet other alternative example of the circuit block 403-1, where the primary windings of the transformers T1 and T2 are connected in parallel, and the transformers T3 and T4 are connected in series.

As shown in FIGS. 4(A)-4(D), implementations of primary windings between individual discrete transformers to achieve different series-parallel combinations between these primary windings can be realized by appropriately arranging a plurality of switches between these them and an external controller can be applied to control the ON or OFF of individual switches according to the actual output voltage/current requirements of the LLC resonant converter, so as to achieve the purpose of dynamically adjusting/controlling the turns ratio N of the transformer.

FIG. 4(E) shows an exemplary circuit block 403-1, where the primary windings of the transformers T1 and T3 in the circuit block 403-1 (resonant tank 403 and transformer circuit 404) are connected in series, the transformers T2 and T4 are disconnected, and the resonant tank 403 is coupled to an additional resonant capacitor $C_r'$ in parallel to the original resonant capacitor $C_r$ through a switch Sc. Similarly, the way of coupling between the additional resonant capacitor $C_r'$ and the original resonant capacitor $C_r$ can also be controlled by arranging switches between $C_r'$ and $C_r$ and the external controller can be applied to turn on or off the individual switches between $C_r'$ and $C_r$ according to the actual output voltage/current demands of the LLC resonant converter, so as to dynamically adjust/control the capacitance of $C_r$ of the resonant tank 403.

In one embodiment, the additional resonant capacitor $C_r'$ is fabricated on a multi-layered PCB to form an adjustable capacitor, and is integrated with the windings of the transformer fabricated on that same PCB.

According to the descriptions of FIGS. 2-4, the present invention can dynamically change or adjust the turns ratio N of the transformer circuit and the resonant capacitance of $C_r$ of the LLC resonant converter based on the actual requirements of output VA, of the LLC resonant converter.

The gain of the LLC resonant converter is represent by equation (1), if $L_r$, $L_m$, $C_r$ and N are all fixed values, the gain $M(f_s, K, Q)$ is determined by the output current $I_o$, the output voltage $V_o$ and the operating frequency $f_s$ of the LLC resonant converter. When $I_o$ and $V_o$ are the target values, the desired gain $M(f_s, K, Q)$ can be obtained by varying the operating frequency $f_s$.

$$M(f_s, K, Q) = \frac{1}{\sqrt{\left(1 + K - K\left(\frac{f_{r1}}{f_s}\right)\right)^2 + Q^2\left(\frac{f_s}{f_{r1}} - \frac{f_{r1}}{f_s}\right)^2}} \quad (1)$$

Where $K = L_r/L_m$ (inductance ratio), $$Q = \frac{\sqrt{L_r/C_r}\,\pi^2 I_o}{8N^2 V_o} \text{(quality factor)}, \quad f_{r1} = \frac{1}{2\pi\sqrt{L_r C_r}},$$

and N is the turns ratio of the primary/secondary side windings of the transformer.

According to the present invention, the turns ratio N of the transformer circuit can be varied through varying coupling in series and or/parallel between primary windings of individual discrete transformers. When the coupling between these windings is adjusted, in addition to the turns ratio N be changed, inductance of $L_m$ and inductance of $L_r$ also be changed, and capacitance of $C_r$ can also be changed by changing the distance between the capacitor plates fabricated on the PCB board. When the parameters of the resonant tank are fixed, the change of $I_o$ and $V_o$ will also change the Q value accordingly, the relationship between the gain M ($f_s$, K, Q) and the operating frequency $f_s$ can be shown according to the change of the Q value.

Figure 5:
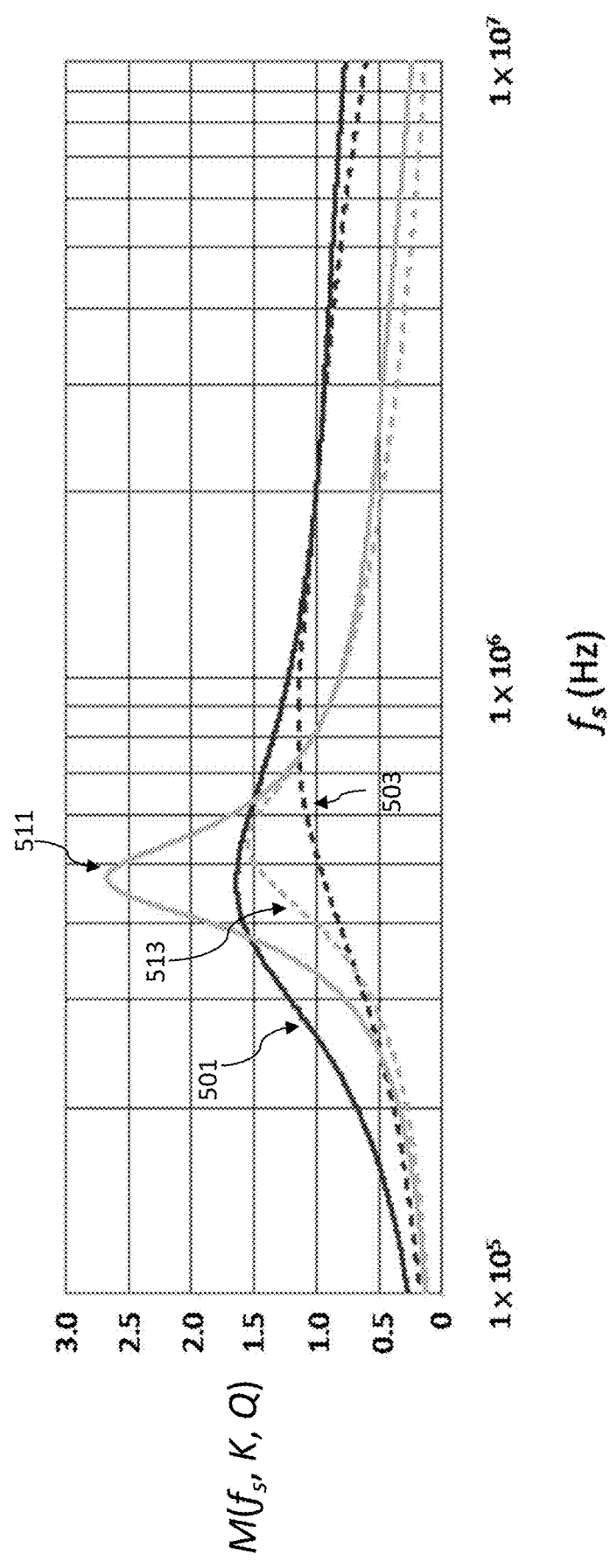
FIG. 5 illustrates the gain curve $M(f_s, K, Q)$ of the LLC resonant power converter versus the operating frequency $f_s$ according to one embodiment of the present invention.

As shown in FIG. 5, when the Q value changes from Q_1 to Q_2, the maximum DC gain changes from more than 1.5 (curve 501) to less than 1.5 (curve 503), the power converter cannot be operated, this case can represent the original designed LLC resonant converter with fixed parameters of its resonant tank. In a case that the turns ratio N is varied causing Q value changed, and the K value also changes to K1 because of wiring of the windings changed. Under the K1 condition, the Q value changes from Q_3 to Q_4, which means that the change of $I_o$ and $V_o$ will also change the Q value accordingly, and the corresponding Q_3 and Q_4 gain values (curves 511 and 513) can be obtained. The maximum DC gain of Q_4 (see curve 513) under the K1 condition having a gain value is greater than a threshold value 1.5, which can meet the gain requirement of the LLC resonant converter.

Generally speaking, changing the turns ratio N can change the Q value quite significantly, even changing the K value slightly by changing the coupling of windings of the transformer circuit. In addition, the resonant frequency $f_{r1}$ and the Q value can be varied by changing the capacitance of $C_r$. Therefore, the range of the output voltage or current can be largely varied by changing the turns ratio N and the resonant capacitor $C_r$ of the LLC resonant converter. This conclusion can be justified from the changes of the maximum DC gain of the curves 511 and 513 shown in FIG. 5.

Figure 6:
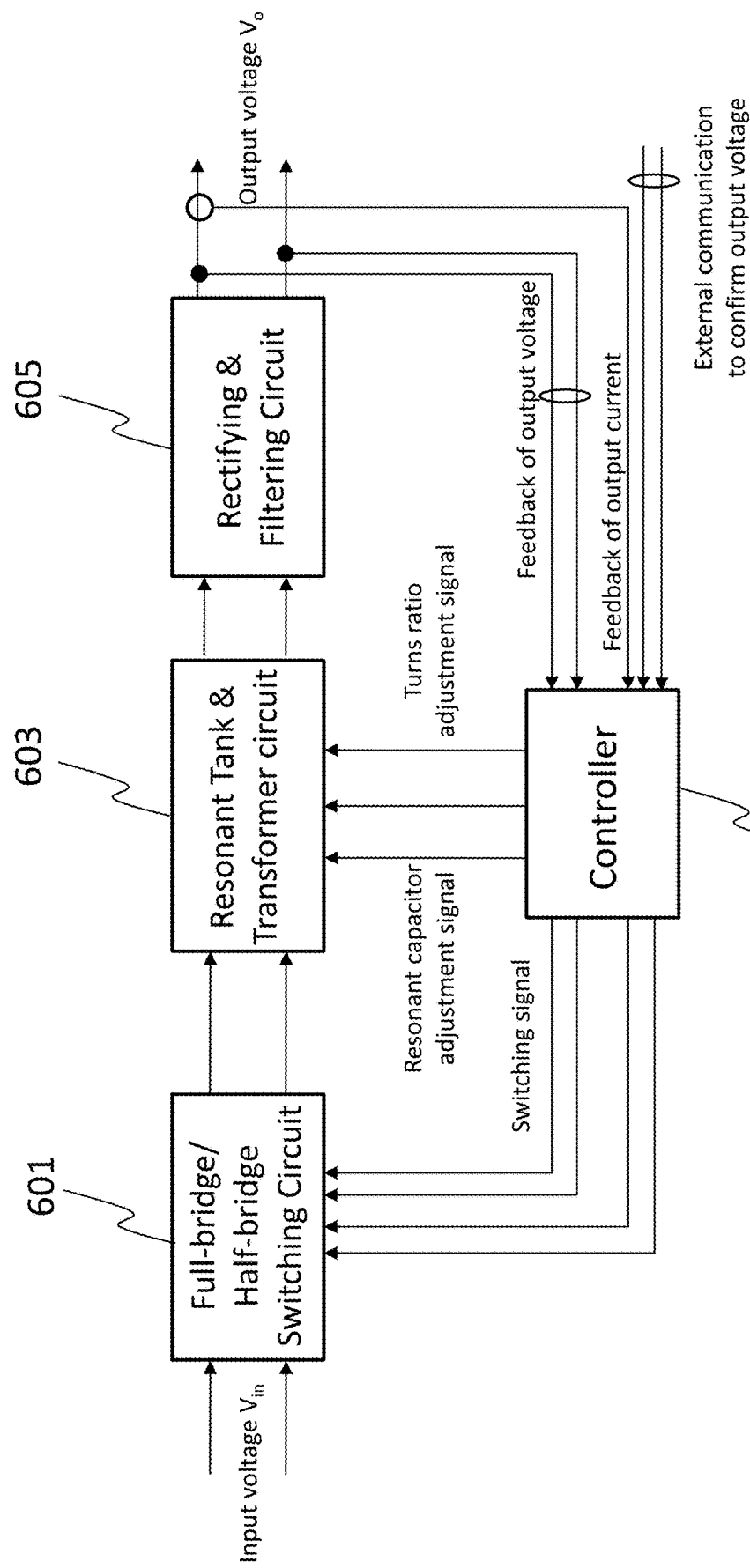
FIG. 6 shows a functional block diagram and related operation control flows of an LLC resonant power converter according to one embodiment of the present invention.

FIG. 6 shows a circuit block diagram and a related operation control flow of an LLC resonant converter. The LLC resonant converter is used to convert an input DC voltage $V_{in}$ into an output DC voltage $V_o$ for supplying the load, which includes a full-bridge/half-bridge switching circuit 601, a resonant tank and transformer circuit 603, a rectifying and filtering circuit 605 and an external control circuit 607. The full-bridge/half-bridge switching circuit 601 is used to introduce a periodically changing switching signal input to the resonant tank and transformer circuit 603 coupled to it, through the external control circuit 607 by controlling turn-on or turn-off of the upper-bridge switches or the lower-bridge switches of the full-bridge/half-bridge switching circuit 601, enabling that the current is fed into the resonant tank and transformer circuit 603 repeatedly to generate voltage and induction electromotive force according to a sinusoidal law. The rectifying and filtering circuit 605 coupled to the secondary winding of the resonant tank and transformer circuit 603 rectifies and filters the varying current of the secondary winding to generate DC current $I_o$ and output DC voltage $V_o$ to be used by a load.

Functional block of the resonant tank and transformer circuit 603 contains a resonant tank (including $L_r$, $L_m$ and $C_r$ connected in series) coupled the full-bridge/half-bridge switching circuit 601 and a transformer circuit (including magnetic core, primary side winding Np and secondary winding Ns) coupled to the rectifying and filtering circuit 605. During the operation of the LLC resonant converter, the rectifying and filtering circuit 605 rectifies and filters the input signal (current or voltage) fed to the secondary side, and converts it into a DC output to provide DC output voltage $V_o$ to the load. The external control circuit 607 is coupled to the full-bridge/half-bridge switching circuit 601, the resonant tank and transformer circuit 603, and the rectifying and filtering circuit 605. The external control circuit 607 receives feedback of the output voltage, feedback of the output current and the external communication signals (to confirm the output voltage) of the LLC resonant converter, and can control the turn-on or turn-off of the upper-bridge switches or the lower-bridge switches in the full-bridge/half-bridge circuit 601 according to the feedback of output voltage, the feedback of output current and the external communication signals. In addition, the received feedback of output voltage and feedback of output current can be respectively used to adjust the resonant tank of the LLC resonant converter by sending resonant tank adjustment and turns ratio adjustment signals from the external controller 607. Therefore, capacitance value of the resonant capacitor $C_r$ and turns ratio of the transformer circuit can be dynamically adjusted to achieve the purpose of varying the range of output voltage and output current of the LLC resonant converter.

In a preferred embodiment, the external control circuit 607 can be a microprocessor, a microcontroller (MCU), a digital signal processor (DSP) or a computing processing device with similar functions.

Basically, once the circuit topology of the LLC resonant converter is finalized, its resonant tank parameters $L_r$, $L_m$ and $C_r$ are determined and cannot be adjusted for different operating scenarios. That is, the range of its output voltage and output current cannot be adjusted according to its operational needs.

In another aspect of the present invention, which further designs the primary windings of the individual discrete transformer to be unequal, so that the turns ratio of the windings is varied as the primary windings are connected in series or in parallel, enabling that the adjustment range of the resonance tank is increased to widen range of output voltage and current without the need to change the external inductance of $L_r$, inductance of $L_m$ and capacitance of $C_r$.

In an alternative, for example, the primary windings of the individual discrete transformer can be designed to have fixed turns while the secondary windings can be designed to have varied turns.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. An LLC converter with variable turns ratio, said LLC converter comprising:
   a switching circuit coupled to an input DC voltage for converting said input DC voltage into a switching signal;
   a resonant tank electrically coupled to said switching circuit, said resonant tank including a resonant inductor, a magnetizing inductor and a resonant capacitor connected in series to receive said switching signal for providing a primary current;
   a transformer circuit electrically coupled to said resonant tank, said transformer circuit having a plurality of discrete transformers, each of said discrete transformers containing a primary winding and a secondary winding,
   wherein said primary winding of each of said discrete transformers have different turns and are dynamically selected to be electrically coupled or isolated from said resonant tank, and are dynamically selected to be connected in series or in parallel with said primary side windings of other transformers to form a dynamically changed equivalent primary winding of said transformer circuit;
   wherein turns of said secondary winding of each of said discrete transformers are fixed and the same, so that turns ratio of said transformer circuit can be dynamically changed accordingly; and
   a rectifying and filtering circuit electrically coupled to said transformer circuit to rectify and filter a secondary current outputted by said secondary winding for providing an output voltage;
   wherein one end of said resonant inductor is electrically coupled to said switching circuit and another end of said resonant inductor is connected in series to said equivalent primary winding;
   wherein said magnetizing inductor is connected in series to said resonant inductor, said resonant capacitor with one end is connected in series to said magnetizing inductor and said equivalent primary winding, and with another end is coupled to said switching circuit;
   wherein said magnetizing inductor is connected in parallel to said equivalent primary winding.

2. The LLC converter with variable turns ratio of claim 1, wherein said equivalent primary winding is formed by arranging a plurality of switches to dynamically adjust coupling between said primary windings.

3. The LLC converter with variable turns ratio of claim 2, wherein said plurality of switches are transistor switching devices or relays.

4. The LLC converter with variable turns ratio of claim 3, wherein inductance of said resonant inductor, inductance of said magnetizing inductor and said turns ratio are dynamically adjusted by said plurality of switches.

5. The LLC converter with variable turns ratio of claim 1, wherein said primary windings and said secondary windings are fabricated on a multi-layered printed circuit board (PCB) to reduce stray characteristics caused by wiring.

6. The LLC converter with variable turns ratio of claim 5, further including an adjustable capacitor disposed on said multi-layered PCB and been integrated into said primary windings and said secondary windings of said transformer circuit to form an additional resonant capacitor.

7. The LLC converter with variable turns ratio of claim 6, wherein said adjustable capacitor is formed by fabricating a plurality of metal plates with fixed area and size at same location on each layer of said multi-layered PCB, and said plurality of metal plates together with a plurality of dielectric layers therein between are combined to form said adjustable capacitor.

8. The LLC converter with variable turns ratio of claim 7, wherein said adjustable capacitor changes resonant capacitance of said resonant tank by adjusting distance between said metal plates and by changing configuration of positive and negative terminals of said metal plates.

9. The LLC converter with variable resonant tank of claim 6, wherein capacitance of said additional resonant capacitor is configured to coupled with said resonant capacitor in parallel, in series or completely isolated by arranging a plurality of switches between said additional resonant capacitor and said windings of said transformer circuit.

10. The LLC converter with variable turns ratio of claim 4, wherein said plurality of switches are configured to dynamically adjust turns ratio of said transformer circuit by sending turns ratio adjustment signals to said transformer circuit through an external controller coupled to said LLC resonant converter, according to received feedback of output voltage and feedback of output current respectively to achieve increasing of range of output voltage and current of said LLC resonant converter.

11. The LLC converter with variable turns ratio of claim 9, wherein said plurality of switches are configured to dynamically adjust capacitance of said resonant capacitor by sending resonant capacitor adjustment signals to said resonant tank through an external controller coupled to said LLC resonant converter, according to received feedback of output voltage and feedback of output current respectively to achieve increasing of range of output voltage and current of said LLC resonant converter.

12. The LLC converter with variable turns ratio of claim 10, wherein said external controller is a microprocessor, microcontroller or a digital processor.

13. The LLC converter with variable turns ratio of claim 1, wherein said plurality of discrete transformers form an array-typed transformer.

14. The LLC converter with variable turns ratio of claim 11, wherein said external controller is a microprocessor, microcontroller or a digital processor.

15. An LLC converter with variable turns ratio, said LLC converter comprising:
   a switching circuit coupled to an input DC voltage for converting said input DC voltage into a switching signal;
   a resonant tank electrically coupled to said switching circuit, said resonant tank including a resonant inductor, a magnetizing inductor and a resonant capacitor connected in series to receive said switching signal for providing a primary current;
   a transformer circuit electrically coupled to said resonant tank, said transformer circuit having a plurality of discrete transformers, each of said discrete transformers containing a primary winding and a secondary winding,
   wherein said primary winding of each of said discrete transformers have fixed turns and are dynamically selected to be electrically coupled or isolated from said resonant tank, and are dynamically selected to be connected in series or in parallel with said primary side windings of other transformers to form a dynamically changed equivalent primary winding of said transformer circuit;
   wherein turns of said secondary winding of each of said discrete transformers are varied, so that turns ratio of said transformer circuit can be dynamically changed accordingly; and
   a rectifying and filtering circuit electrically coupled to said transformer circuit to rectify and filter a secondary current outputted by said secondary winding for providing an output voltage;
   wherein one end of said resonant inductor is electrically coupled to said switching circuit and another end of said resonant inductor is connected in series to said equivalent primary winding;
   wherein said magnetizing inductor is connected in series to said resonant inductor, said resonant capacitor with one end is connected in series to said magnetizing inductor and said equivalent primary winding, and with another end is coupled to said switching circuit;
   wherein said magnetizing inductor is connected in parallel to said equivalent primary winding.

16. The LLC converter with variable turns ratio of claim 15, wherein said equivalent primary winding is formed by arranging a plurality of switches to dynamically adjust coupling between said primary windings.

17. The LLC converter with variable turns ratio of claim 16, wherein said plurality of switches are transistor switching devices or relays.

18. The LLC converter with variable turns ratio of claim 17, wherein inductance of said resonant inductor, inductance of said magnetizing inductor and said turns ratio are dynamically adjusted by said plurality of switches.

19. The LLC converter with variable turns ratio of claim 15, wherein said primary windings and said secondary windings are fabricated on a multi-layered printed circuit board (PCB) to reduce stray characteristics caused by wiring.

20. The LLC converter with variable turns ratio of claim 19, further including an adjustable capacitor disposed on said multi-layered PCB and integrated into said primary windings and said secondary windings of said transformer circuit to form an additional resonant capacitor, wherein said adjustable capacitor is formed by fabricating a plurality of metal plates with fixed area and size at same location on each layer of said multi-layered PCB, and wherein said plurality of metal plates together with a plurality of dielectric layers therein between are combined to form said adjustable capacitor.

* * * * *